United States Patent [19]

Grünthaler et al.

[11] Patent Number: 4,818,283

[45] Date of Patent: Apr. 4, 1989

[54] DISPERSION HARDENED COPPER ALLOYS AND PRODUCTION PROCESS THEREFORE

[75] Inventors: Karl-Heinz Grünthaler, Usingen; Dieter Langbein, Bad Homburg; Fehmi Nilmen, Kriftel/Ts.; Heinrich Winter, Eschborn, all of Fed. Rep. of Germany

[73] Assignee: Battelle-Institut e.V., Frankfurt am Main, Fed. Rep. of Germany

[21] Appl. No.: 109,273

[22] Filed: Oct. 16, 1987

[30] Foreign Application Priority Data

Oct. 17, 1986 [DE] Fed. Rep. of Germany ....... 3635370

[51] Int. Cl.$^4$ ................................................. G22F 3/00
[52] U.S. Cl. .......................................... 75/247; 75/56; 75/76; 148/13.2; 148/411; 419/33; 419/66; 419/67; 420/469; 420/495; 420/590
[58] Field of Search ......................... 75/0.5 G, 247, 76; 419/33, 66, 67; 420/469, 495, 590; 148/13, 2, 411

[56] References Cited

U.S. PATENT DOCUMENTS

| | | | |
|---|---|---|---|
| 3,947,949 | 4/1976 | Wallbaum | 419/28 |
| 3,969,156 | 7/1976 | Wallbaum | 148/12.7 C |
| 4,312,667 | 1/1982 | Guentin | 75/65 R |
| 4,579,587 | 4/1986 | Grant et al. | 75/0.5 BB |
| 4,626,282 | 12/1986 | Naya et al. | 419/48 |

*Primary Examiner*—Stephen J. Lechert, Jr.
*Attorney, Agent, or Firm*—Spencer & Frank

[57] ABSTRACT

A process for producing a dispersion hardened copper alloy includes admixing to a copper melt from 0.3 to 15 weight % of molybdenum to provide a mixture which is a melt; superheating the mixture to a temperature ranging from about 200° C. to about 1000° C. above the melting point of coper to provide a superheated melt; and subjecting the superheated melt to very rapid solidification at a cooling rate ranging from 104° to 106° C./sec. The above process produces dipsersion hardened copper alloy comprising copper and from 1 to 15 weight % of molybdenum which is present in the dispersion hardened copper alloy as particles having a diameter of less than 0.1 μm embedded in the copper matrix. Such dispersion hardened copper alloys are useful for providing electrical conductors which are subjected to elevated temperatures, such as for providing spot welding electrodes, particularly for welding of zinc-galvanized sheet metal. Such alloys do not become brittle when heated up to around about 500° C. or even up to around about 800° C.

22 Claims, No Drawings

DISPERSION HARDENED COPPER ALLOYS AND PRODUCTION PROCESS THEREFORE

BACKGROUND OF THE INVENTION

1. Field of the Invention

The present invention relates to dispersion hardening of copper and, in particular, to a process for producing dispersion hardened copper alloys and use of such alloys for spot welding electrodes.

2. Description of the Related Art

Presently known processes for dispersion hardening of copper are of three types. Extremely fine, and thus very expensive, powders of copper matrix metal have been carefully mixed with a dispersoid, such as extremely fine particles of $Al_2O_3$ or BeO and compacted and extruded. Alternately, alloys of copper matrix metal have been prepared and contain small percentages of easily oxidized metals, such as beryllium or aluminium. These prepared alloys are then processed into powders and the powders are subjected to internal oxidation, an expensive step which, if controlled correctly, results in the desired fine distribution of oxide particles in the matrix, with the oxide particles having a diameter of less than 0.1 μm. This process, however, has the drawback that copper is also externally oxidized during the internal oxidation step. This necessitates a further heat treatment with hydrogen in order to reduce copper oxide to copper. During this further heat treatment, however, it is almost impossible to avoid baking together of the powders. Moreover, both of the aforementioned prior art processes are expensive and, thus, have not been widely accepted. Simultaneous precipitation of copper matrix metal and dispersoid from appropriate metal salt solutions is also known, but is too expensive for industrial use.

Generally, all metals including copper dispersion hardened with oxides of the aforementioned type exhibit great brittleness when heated to around about 500° C. and above. Further, ductility decreases with increasing temperature and reaches a minimum of about 2% at about 500° C. compared to the good ductility at room temperature for which elongation values around about 20% are typical. Embrittlement and loss of ductility constitute grave drawbacks of prior art dispersion hardened alloys.

SUMMARY OF THE INVENTION

It is an object of the present invention to provide a simple and economical process for producing dispersion hardened copper alloys which do not become brittle when heated.

It is a further object of the present invention to provide dispersion hardened copper alloys which do not become brittle and lose ductility when heated.

It is yet another object of the present invention to provide dispersion hardened copper alloys useful for producing welding electrodes, especially spot welding electrodes or welding galvanized metal sheet.

These and other objects of the present invention are accomplished by a process for producing a dispersion hardened, copper alloy which includes admixing to a copper melt from 0.3 to 15 weight % molybdenum to provide a mixture superheating the mixture to a temperature ranging from about 200° C. to about 1000° C. above the melting point of copper to provide a superheated melt; and subjecting the superheated melt to very rapid solidification at a cooling rate ranging from $10^4$ to $10^6$ °C./sec.

The objects of the present invention are further accomplished by providing a dispersion hardened copper alloy comprised of copper and from 3.0 to 15 vol.-% molybdenum, which at least molybdenm metal is present in the dispersion hardened copper alloy as particles having a diameter of less than 0.1 μm embedded in the copper matrix and produced by the aforementioned process. Such dispersion hardened copper alloys are useful for providing electrical conductors which are subjected to elevated temperatures such as for providing spot welding electrodes on surfaces to be welded, particularly zinc-galvanized sheet metal.

Superheating means heating to temperatures essentially above the melting point of the matrix metal, here of copper.

The superheating step of the process brings the molybdenum into solution in the copper melt which, after the very rapid solidification step, precipitates as highly effective dispersoid embedded in the copper matrix and having a particle size of less than 0.1 μm. The present invention, thus, produces dispersion hardened copper alloys in an economical manner directly from a melt. The molybdenum precipitated as dispersoid in the copper-matrix most advantageously prevent the dispersion hardened copper alloys from becoming brittle when heated with the attendant loss of ductility thereof.

The superheated melt may be caused to solidify in the form of granulates and the process may include the further steps of compacting the granulates into rods for extrusion.

Very rapid cooling of the superheated melt may be accomplished by atomizing the superheated melt to form granulates. Atomizing may be effected by utilizing an inert gas, which inert gas may be selected from among argon and helium. Further, the inert gas may contain small percentages of hydrogen, that is, from a trace amount up to 5% hydrogen.

Alternately, very rapid cooling of the superheated melt may be accomplished by melting away and granulating pressed powder bodies to form granulates. The melting away and granulating may be accomplished by a rotating electrode apparatus in the known rotating electrode process.

(The rotating electrode process: Material in the form of a rod electrode is rotated at 250 rev/sec while it is melted by an electric arc, plasma arc, or electron beam. The molten metal is ejected centrifugally as molten metal droplets which solidify before hitting the walls of the inert-gas-filled chamber.)

Yet another method for accomplishing very rapid cooling is by directly processing the superheated melt into bands. Direct processing of the superheated melt into bands may be accomplished by a melt spinning apparatus in a melt spinning process.

The molybdenum for admixing to the copper melt may have the form of fine powder and, preferably, is fine powder having a particle size ranging from 1 to 20 μm, most preferably from 3 to 15 μm. Alternately, the molybdenum for admixing to the copper melt may have the form of pressed bodies, such as pellets, comprised of a mixture of fine powders of copper and the molybdenum. The fine powders preferably have a particle size ranging from 1 to 20 μm, most preferably from 3 to 15 μm.

The process preferably includes a further step of deoxidizing the copper melt, prior to admixing the molybdeum, by admixing to the copper melt a readily oxidized metal in an amount effective to deoxidize the copper melt. The readily oxidized metal may be, for example, aluminium.

Small additions of aluminium lower the oxygen content of a copper melt to less than 10 ppm according to the reaction:

$$3\ CuO + 2\ Al \rightarrow 3\ Cu + Al_2O_3$$

DESCRIPTION OF THE PREFERRED EMBODIMENTS

In tests on which the invention is based, it was surprisingly found that molybdenum is particularly well suited as dispersoid for the production of dispersion hardened copper alloys because it prevent the latter from becoming brittle when heated. At temperatures above 1500° C., quantities of molybdenum sufficient for dispersion hardening could be brought into solution in a copper melt which had previously been carefully deoxidized, for example, with aluminium.

Therefore, a preferred embodiment of the present invention produces dispersion hardened copper alloys by adding from 3.0 to 15 weight % molybdenum, particularly in the form of pressed powder bodies composed of copper powder or molybdenum powder, into a copper melt which has previously been carefully deoxidized, followed by superheating the mixture to a temperature of up to 1000° C., preferably 200° to 850° C., above the melting point of the copper (i.e., above 1083° C.). This is effected, in particular, in a protective gas atmosphere, such as an inert atmosphere, for example, argon. This superheated melt is then atomized, that is, reduced to minute particles, using an inert gas, particularly argon, with solidification rates of more than $10^4$ °C./sec being realized (Gas atomization: The principle of gas atomization is simple: a continuous stream of liquid metal is broken down into droplets by a subsonic or supersonic gas stream or jet. Atomization occurs by kinetic energy transfer from the atomizing medium to the metal.) The resulting powdery particles are then compacted into extrusion rods and are then pressed or otherwise shaped into semi-finished products.

The process is governed by a number of interrelated operating parameters. Controllable variables include jet distance, jet pressure, nozzle geometry, velocity of gas and metal, and metal superheat.

Gas atomization pressures are typically in the range $14 \times 10^5$ Pa to $42 \times 10^5$ Pa at gas velocities from 50 m sec$^{-1}$ to 150 m sec$^{-1}$.

In further tests it was found that this dispersoid, i.e., molybdenum particles of submicron size, embedded in the copper matrix will not become coarser even after heat treatments lasting several hours and reaching temperatures up to 850° C. This indicates that the solubility of these particles in the copper matrix at least up to this temperature must be very low. This is a basic prerequisite for effective dispersion hardening of copper and copper alloys, and for good electrical and thermal conductivity thereof.

A copper alloy including 3 weight % of finely dispersed molybdenum particles having a mean particle diameter of about 0.07 μm and dispersion hardened according to the present invention by admixing, superheating and atomizing the melt, after extrusion, exhibited an electrical conductivity of 90% of the conductivity of pure copper. This extruded sample had a tensile strength under applied heat (800° C.) of 15 kp/mm² with an elongation at rupture of 23%. Thus, this alloy according to the invention does not appear to become brittle when heated to elevated temperatures.

The alloys according to the invention are particularly suitable for electrical conductors which are subjected to elevated temperatures, such as, for examples, spot welding electrodes, commutator segments and contacts. In addition to excellent electrical conductivity, they also exhibit very good thermal conductivity.

Alloys produced according to the present invention and containing a larger weight percentage of molybdenum particles are particularly for the production of contacts and spot welding electrodes. At temperatures around about 1800° C., approximately 7 weight % molybdenum can be brought into solution in a copper melt. Even greater percentages, up to 15 weight %, molybdenum can be produced in a vacuum arc furnace by melting off and granulating self-consuming, powder-metallurgically produced electrodes, for example, with the use of the known REP process (rotating electrode process). Extruded rods produced from such granulates are particularly suitable for the production of spot welding electrodes having a long service life, particularly for welding of zincgalvanized sheet metal.

It is also within the scope of the present invention to effect an extremely rapid solidification of the superheated melts according to the known melt spinning process. In this way, one arrives directly at dispersion hardened alloy bands which can be shaped by cold rolling.

Molybdenum particles having a diameter of about 3 to 15 μm are particularly suitable for. the production of copper-molybdenum masteralloys (pressed powder bodies) for introduction into the copper melt. Masteralloys are formed by mixing well, for example, molybdenum particles and copper particles of a similar grain size, and pressing the mixed powders at a pressure ranging from about 1 to 3 t/cm² to form pressed powder bodies which are then presintered in a protective gas atmosphere.

It will be understood that the above description of the present invention is susceptible to various modifications, changes and adaptations, and the same are intended to be comprehended within the meaning and range of equivalents of the appended claims.

What is claimed is:

1. A process for producing a dispersion hardened copper alloy, comprising:
    admixing to a copper melt from 3.0 to 15 weight % of molybdenum to provide a mixture which is a melt;
    superheating the mixture to a temperature ranging from about 200° C. to about 1000° C. above the melting point of copper to provide a superheated melt; and
    subjecting the superheated melt to very rapid solidification at a cooling rate ranging from $10^4$ to $10^6$ °C./sec.

2. The process according to claim 1, wherein the very rapid solidification of the superheated melt is accomplished by atomizing the superheated melt to form granulates or powders.

3. The process according to claim 2, wherein atomizing is effected by utilizing an inert gas.

4. The process according to claim 3, wherein the inert gas is selected from among argon and helium.

5. The process according to claim 3, wherein the inert gas contains from a trace amount up to 5% hydrogen.

6. The process according to claim 2, comprising the further steps of compacting the granulates or powders into extrusion rods and extrusion of said rods.

7. The process according to claim 1, wherein the very rapid solidification of the superheated melt is accomplished by melting away and granulating pressed powder bodies to form granulates.

8. The process according to claim 7, wherein the melting away and granulating is accomplished by a rotating electrode means.

9. The process according to claim 7, comprising the further steps of compacting the granulates into extrusion rods and extrusion of said rods.

10. The process according to claim 1, wherein the very rapid solidification is accomplished by directly processing the superheated melt into bands.

11. The process according to claim 10, wherein directly processing the superheated melt into bands is accomplished by a melt spinning means.

12. The process according to claim 1, wherein the superheated melt is solidified in the form of granulates or powders and the process comprises the further steps of compacting the granulates or powders into extrusion rods and extrusion of said rods.

13. The process according to claim 1, wherein molybdenum for admixing to the copper melt is in the form of a fine powder.

14. The process according to claim 13, wherein the fine powder has a particle size ranging from 1 to 20 $\mu$m.

15. The process according to claim 14, wherein the fine powder has a particle size ranging from 3 to 15 $\mu$m.

16. The process according to claim 1, wherein molybdenum for admixing to the copper melt has the form of pressed bodies comprised of a mixture of fine powders of copper and molybdenum.

17. The process according to claim 16, wherein the fine powders have a particle size ranging from 1 to 20 $\mu$m.

18. The process according to claim 17, wherein the fine powders have a particle size ranging from 3 to 15 $\mu$m.

19. The process according to claim 1, comprising the further step of deoxidizing the copper melt, prior to admixing the molybdenum, by admixing to the copper melt of a readily oxidized metal in an amount effective to deoxidize the copper melt.

20. The process according to claim 19, wherein the readily oxidized metal is aluminium.

21. A dispersion hardened copper alloy comprising copper and from 1 to 15 weight % molybdenum, which at least one metal is present in the dispersion hardened copper alloy as particles having a diameter of less than 0.1 $\mu$m embedded in the copper matrix and produced by a process comprising:
  admixing to a copper melt from 3.0 to 15 weight % of molybdenum to provide a mixture which is a melt;
  superheating the mixture to a temperature ranging from about 200° C. to about 1000° C. above the melting point of copper to provide a superheated melt; and
  subjecting the superheated melt to very rapid solidification at a cooling rate ranging from $10^4$ to $10^6$ °C./sec.

22. A spot welding electrode comprised of a composition produced by the method of claim 1.

* * * * *